US012313439B2

(12) United States Patent
Eriksson (10) Patent No.: US 12,313,439 B2
(45) Date of Patent: May 27, 2025

(54) RADAR LEVEL GAUGE SYSTEM AND METHOD WITH TRANSMISSION LINE PROBE AND STEPPED FREQUENCY SWEEP

(71) Applicant: Rosemount Tank Radar AB, Mölnlycke (SE)

(72) Inventor: Mikael Eriksson, Västervik (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 454 days.

(21) Appl. No.: 17/859,108

(22) Filed: Jul. 7, 2022

(65) Prior Publication Data

US 2023/0063153 A1    Mar. 2, 2023

(30) Foreign Application Priority Data

Aug. 24, 2021 (EP) ..................... 21192737

(51) Int. Cl.
*G01F 23/284* (2006.01)
*G01S 7/00* (2006.01)
*G01S 7/35* (2006.01)
*G01S 7/41* (2006.01)
(Continued)

(52) U.S. Cl.
CPC ............ *G01F 23/284* (2013.01); *G01S 7/003* (2013.01); *G01S 7/354* (2013.01); *G01S 7/41* (2013.01); *G01S 13/08* (2013.01); *G01S 13/88* (2013.01)

(58) Field of Classification Search
None
See application file for complete search history.

(56) References Cited

U.S. PATENT DOCUMENTS 8,847,816 B2    9/2014 Feil
2007/0103333 A1*   5/2007 Michalski .............. G01S 13/88
                                                      340/853.1
(Continued)

FOREIGN PATENT DOCUMENTS

EP          3126795 A1    2/2017
WO       2015150441 A1   10/2015

OTHER PUBLICATIONS

Extended European Search Report from European Patent Application No. 21192737.1, dated Feb. 9, 2022.

*Primary Examiner* — Marcus E Windrich
(74) *Attorney, Agent, or Firm* — Westman, Champlin & Koehler, P.A.

(57) ABSTRACT

A method of determining a filling level of a product in a tank, comprising the steps of: generating an electromagnetic transmit signal exhibiting a measurement sweep across a time series of piece-wise constant frequencies being within a measurement frequency range starting at a first frequency, and ending at a second frequency higher than the first frequency, a difference between frequencies in each pair of adjacent frequencies in the frequency range being equal to the first frequency; guiding the transmit signal towards and into the product in the tank; guiding an electromagnetic reflection signal back towards the transceiver; mixing the reflection signal with an electromagnetic reference signal, resulting in a mixer output indicative of a difference between the reflection signal and the reference signal; forming a measurement signal based on the mixer output; and determining the filling level based on the measurement signal.

15 Claims, 6 Drawing Sheets

(51) Int. Cl.
*G01S 13/08* (2006.01)
*G01S 13/88* (2006.01)

(56) References Cited

U.S. PATENT DOCUMENTS

| | | |
|---|---|---|
| 2015/0253176 A1* | 9/2015 | Jirskog .................... G01S 7/35 342/124 |
| 2016/0103006 A1* | 4/2016 | Edvardsson ............ G01S 13/88 342/124 |
| 2016/0202347 A1* | 7/2016 | Malinovskiy .......... G01S 13/88 342/124 |
| 2017/0254692 A1* | 9/2017 | Faber ....................... H01P 3/06 |
| 2018/0292252 A1 | 10/2018 | Edvardsson et al. |
| 2019/0107425 A1* | 4/2019 | Welle ..................... G01S 13/88 |

* cited by examiner

RADAR LEVEL GAUGE SYSTEM AND METHOD WITH TRANSMISSION LINE PROBE AND STEPPED FREQUENCY SWEEP

CROSS-REFERENCE TO RELATED APPLICATION

This application claims priority to European Patent Application No. 21192737.1, filed Aug. 24, 2021, the content of which is hereby incorporated by reference in its entirety.

TECHNICAL FIELD OF THE INVENTION

The present invention relates to a radar level gauge system and method, for determining a filling level of a product in a tank.

TECHNICAL BACKGROUND

In filling level determining systems functioning by transmitting and receiving electromagnetic signals using a transmission line probe extending towards and into a product in a tank, pulsed electromagnetic signals are usually used. Although having the capability of providing excellent measurement accuracy, such so-called pulsed guided wave radar (GWR) systems have drawbacks.

For instance, it has proven to be relatively challenging to handle issues related to timing and temperature dependence, especially while striving for low cost and complexity.

For non-contact radar level gauge systems, pulsed signals are generally not used. Instead, various implementations of FMCW-techniques are typically used. Recently, the trend has been towards stepped measurement sweeps and higher frequencies. The reasons for increasing the frequency of the measurement signals include that the dimensions of the non-contact radar level gauge system can be reduced and that the measurement accuracy can be improved.

There have also been efforts to implement FMCW-type techniques on guided wave radar systems. For instance, US 2016/0103006 discloses an FMCW-type radar level gauge configured to transmit an electromagnetic transmit signal and receive an electromagnetic return signal reflected from the surface, the electromagnetic transmit signal having a bandwidth of at least 1 GHz, a relative bandwidth (max frequency/min frequency) of less than 2.5 and an upper frequency limit less than 4 GHz. The gauge according to US 2016/0103006 comprises a single conductor probe mechanically suspended in the tank and extending into the product in the tank, and a matching arrangement providing an electrically matched connection between an electrical feed-through and the single conductor probe.

Although the radar level gauge system according to US 2016/0103006 apparently has various advantageous properties, it would be desirable to provide for improved measurement performance.

SUMMARY OF THE INVENTION

In view of the above, a general object of the present invention is to provide for improved measurement performance in a radar level gauge system using a transmission line probe for guiding electromagnetic signals.

According to a first aspect of the present invention, it is therefore provided a method of determining a filling level of a product in a tank using a radar level gauge system comprising a transceiver, a transmission line probe, and processing circuitry, the method comprising the steps of: generating an electromagnetic transmit signal exhibiting a measurement sweep across a time series of piece-wise constant frequencies being within a measurement frequency range starting at a first frequency, and ending at a second frequency higher than the first frequency, a difference between frequencies in each pair of adjacent frequencies in the frequency range being equal to the first frequency; guiding the transmit signal towards and into the product in the tank; guiding an electromagnetic reflection signal, resulting from reflection of the transmit signal at impedance discontinuities encountered thereby, back towards the transceiver; mixing the reflection signal with an electromagnetic reference signal exhibiting a reference sweep across a time series of piece-wise constant reference frequencies, the reference signal being in phase with the transmit signal at a start of the measurement sweep and exhibiting a constant frequency difference in relation to the transmit signal across the measurement sweep, the mixing resulting in a mixer output indicative of a difference between the reflection signal and the reference signal; forming a measurement signal based on the mixer output; and determining the filling level based on the measurement signal.

The present invention is based on the realization that the use of a transmit signal in which the difference between adjacent frequencies is equal to the lowest frequency of the frequency range of the transmit signal allows for signal processing providing information about polarities of echo signals resulting from reflection of the transmit signal at the impedance discontinuities encountered thereby. This facilitates the identification of echo signals resulting from reflection of the transmit signal at certain impedance discontinuities, such as a reference impedance discontinuity at an interface between the transceiver and the transmission line probe and/or an impedance discontinuity at an end of the transmission line probe. This, in turn, provides for more robust and reliable filling level determination.

Furthermore, the transmit signal configuration according to embodiments of the present invention may provide an unambiguous relation between the difference in phase between the reflection signal and the transmit signal, and the filling level. This provides for improved precision in the determination of the filling level, in relation to determining the filling level using frequency shift information.

According to a second aspect of the present invention, it is provided a radar level gauge system, for determining a filling level of a product in a tank, the radar level gauge system comprising: a transceiver for generating, transmitting, and receiving electromagnetic signals; a transmission line probe coupled to the transceiver and configured to guide an electromagnetic transmit signal from the transceiver towards and into the product in the tank, and guide an electromagnetic reflection signal, resulting from reflection of the transmit signal at impedance discontinuities encountered thereby, back towards the transceiver; and processing circuitry coupled to the transceiver for determining the filling level based on a timing relation between the reflection signal and the transmit signal, wherein the radar level gauge system is configured to: generate the transmit signal to include a measurement sweep across a time series of piece-wise constant frequencies being within a measurement frequency range starting at a first frequency, and ending at a second frequency higher than the first frequency, a difference between frequencies in each pair of adjacent frequencies in the frequency range being equal to the first frequency; mix the reflection signal with an electromagnetic reference signal exhibiting a reference sweep across a time series of piece-wise constant reference frequencies, the reference signal being in phase with the transmit signal at a start of the measurement sweep and exhibiting a constant frequency difference in relation to the transmit signal across the measurement sweep, the mixing resulting in a mixer output indicative of a difference between the reflection signal and the reference signal; form a measurement signal based on the mixer output; and determine the filling level based on the measurement signal.

The "transceiver" may be one functional unit capable of transmitting and receiving microwave signals, or may be a system comprising separate transmitter and receiver units. For all embodiments, it should be noted that the processing circuitry may be provided as one device or several devices working together.

In summary, the present invention thus relates to a method of determining a filling level of a product in a tank, comprising the steps of: generating an electromagnetic transmit signal exhibiting a measurement sweep across a time series of piece-wise constant frequencies being within a measurement frequency range starting at a first frequency, and ending at a second frequency higher than the first frequency, a difference between frequencies in each pair of adjacent frequencies in the frequency range being equal to the first frequency; guiding the transmit signal towards and into the product in the tank; guiding an electromagnetic reflection signal back towards the transceiver; mixing the reflection signal with an electromagnetic reference signal, resulting in a mixer output indicative of a difference between the reflection signal and the reference signal; forming a measurement signal based on the mixer output; and determining the filling level based on the measurement signal.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

In the present detailed description, various embodiments of the radar level gauge system and method are mainly discussed with reference to a radar level gauge system comprising a transmission line probe in the form of single conductor probe, or so-called Goubau probe.

It should be noted that this by no means limits the scope of the present invention, which equally well includes radar level gauge systems and methods using other types of transmission line probes, such as a coaxial probe or a parallel wire transmission line probe.

Figure 1A:
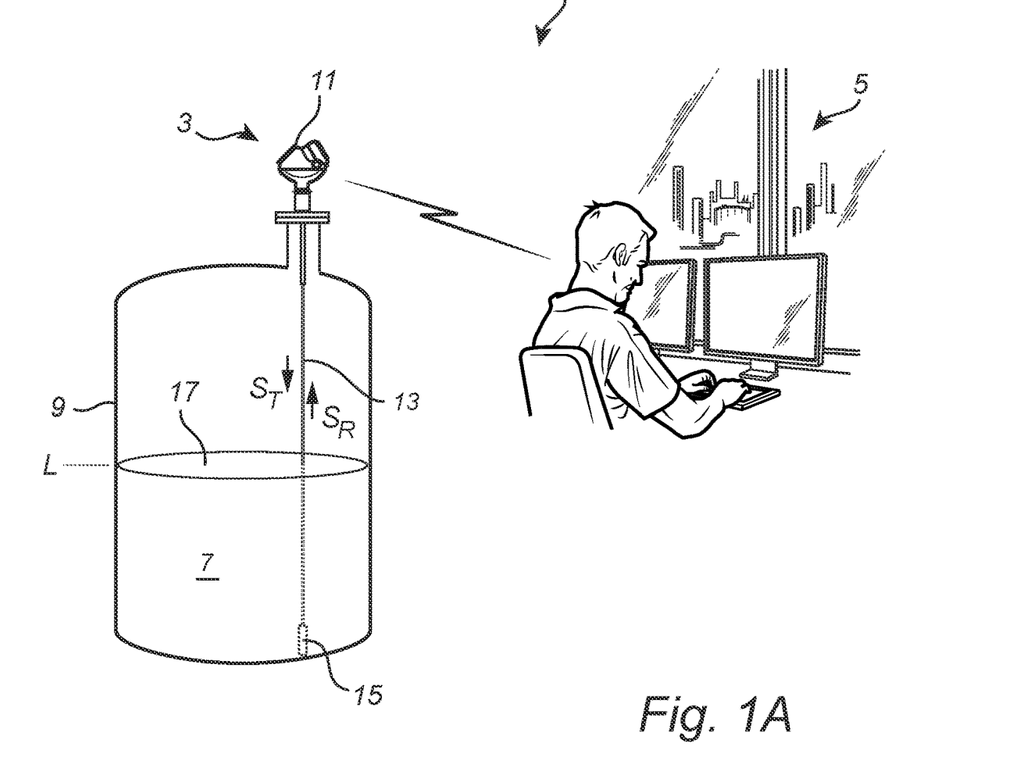
FIG. 1A schematically illustrates an exemplary tank arrangement comprising a radar level gauge system according to an embodiment of the present invention.

FIG. 1A schematically shows a level measuring system 1 comprising a radar level gauge system 3 according to an example embodiment of the present invention, and a host system 5 illustrated as a control room.

The radar level gauge system 3 is installed to measure the filling level of a product 7 in a tank 9. The radar level gauge system 3 comprises a measuring electronics unit 11 arranged outside the tank 9, and a transmission line probe, here in the form of a single conductor probe 13, extending from the measuring electronics unit 11 towards and into the product 7. In the example embodiment in FIG. 1A, the single conductor probe 13 is a wire probe, that has a weight 15 attached at the end thereof to keep the wire straight and vertical.

By analyzing a timing relation between an electromagnetic transmit signal $S_T$ being guided by the transmission line probe 13 towards the surface 17 of the product 7, and an electromagnetic reflection signal $S_R$ being guided back from the surface 17 by the transmission line probe 13, the measurement electronics unit 11 can determine the distance between a reference position (such as a feed-through between the outside and the inside of the tank) and the surface 17 of the product 7, whereby the filling level L can be deduced. It should be noted that, although a tank 9 containing a single product 7 is discussed herein, the distance to another material interface along the transmission line probe 13 (if present) may be measured in a similar manner.

Figure 1B:
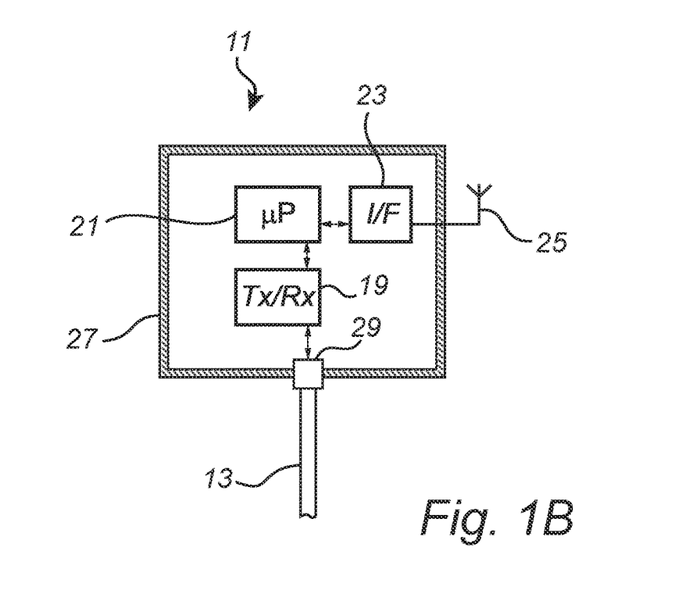
FIG. 1B is a schematic illustration of the radar level gauge system in FIG. 1A.

As is schematically illustrated in FIG. 1B, the measurement electronics unit 11 comprises a transceiver 19, processing circuitry 21, a communication interface 23, and a communication antenna 25 for wireless communication with the control room 5. The transceiver 19, the processing circuitry 21, and the communication interface 23 are all illustrated as being enclosed in a measurement electronics unit housing 27.

The transceiver 19 is configured to generate, transmit and receive electromagnetic signals, and is coupled to the transmission line probe 13 via a feed-through 29 through a wall of the tank 9. Various suitable feed-through configurations are, per se, known in the art, and the feed-through 29 is schematically indicated as a simple box in FIG. 1B.

The processing circuitry 21 is coupled to the transceiver 19 and is configured to determine the filling level L based on a timing relation between the reflection signal $S_R$ and the transmit signal $S_T$ as will be described in greater detail further below. The communication interface 23 is connected to the processing circuitry 21 and configured to allow communication with the host system 5 via the communication antenna 25. In the example embodiment of FIGS. 1A-B, the communication between the radar level gauge system 3 and the host system 5 is indicated as being wireless communication. Alternatively, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol.

Moreover, although not shown in FIG. 1B, the radar level gauge system 3 may be connectable to an external power source, or may be powered through communication lines.

Figure 2:
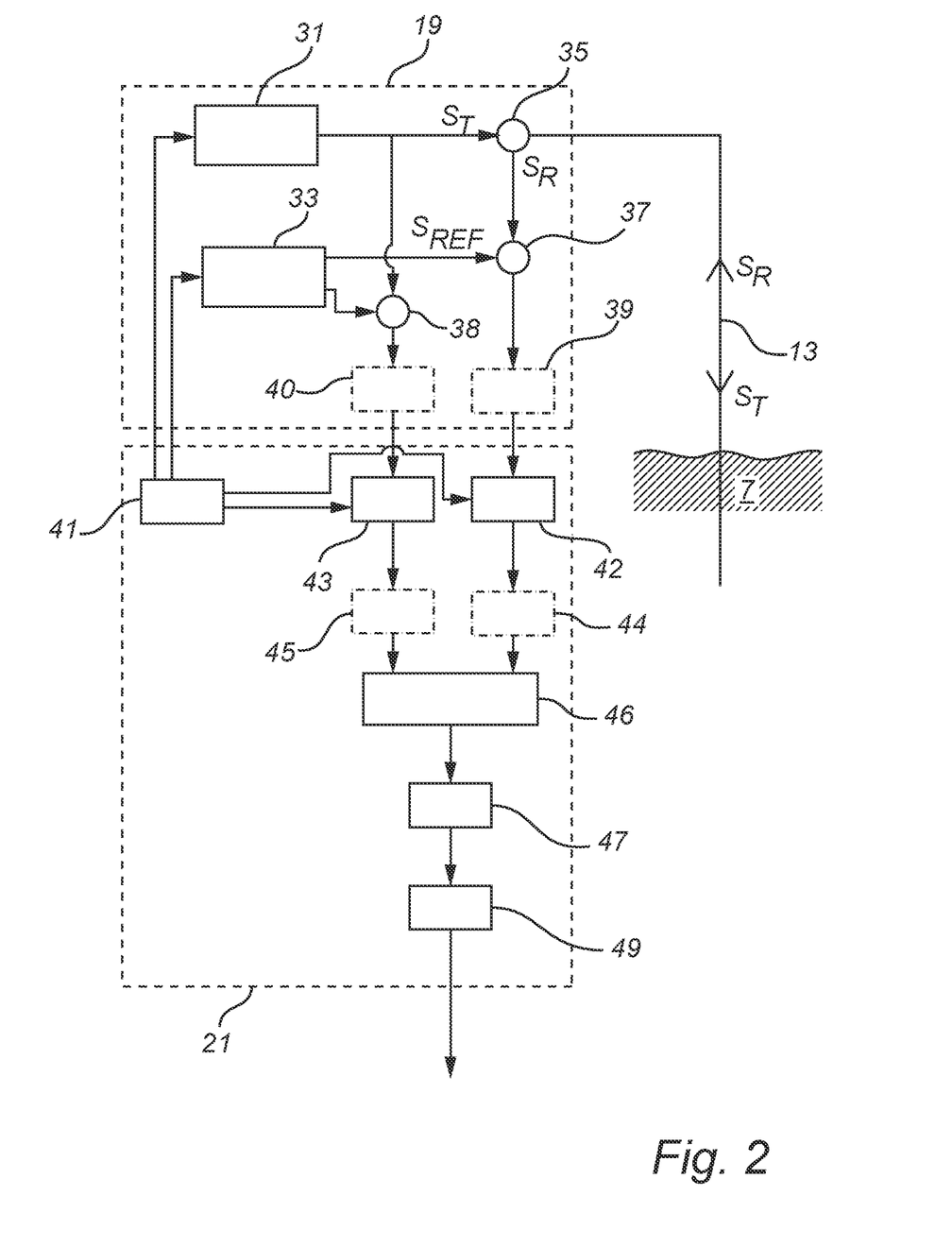
FIG. 2 is a partial schematic block diagram of the radar level gauge system in FIGS. 1A-B.

FIG. 2 is a partial schematic block diagram of an example configuration of the radar level gauge system 3 in FIGS. 1A-B.

The transceiver 19 is here shown as including a first signal generator 31, a second signal generator 33, a power divider 35, a first mixer 37, a second mixer 38, and optional first 39 and second 40 analog bandpass filters. The processing circuitry 21 is shown as including timing circuitry 41, first 42 and second 43 samplers, first 44 and second 45 optional digital bandpass filters, a measurement block 46, a transformation block 47, and a filling level determining block 49.

As is schematically indicated in FIG. 2, the timing circuitry 41 is coupled to the first signal generator 31 and to the second signal generator 33. The timing circuitry 41 is configured to control the first signal generator 31 to generate a transmit signal $S_T$, and to control the second signal generator 33 to generate a reference signal $S_{REF}$. The first signal generator 31 is connected to the transmission line probe 13 via the power divider 35, and thus provides the transmit signal $S_T$ to the transmission line probe 13. The reflection signal $S_R$ guided back by the transmission line probe 13 is routed by the power divider 35 to the first mixer 37, which is also connected to receive the reference signal $S_{REF}$ from the second signal generator 33. The reference signal $S_{REF}$ provided by the second signal generator 33 and the reflection signal $S_R$ from the transmission line probe 13 are combined by the first mixer 37, resulting in a mixer output indicative of a difference between the reflection signal $S_R$ and the reference signal $S_{REF}$. In embodiments where there is a constant non-zero frequency difference between the transmit signal $S_T$ and the reference signal $S_{REF}$, the portion of the mixer output that is of interest for additional processing will exhibit a frequency that is substantially equal to this non-zero frequency difference. To facilitate subsequent signal processing, the mixer output may therefore optionally be passed through a first analog bandpass filter 39, as is schematically indicated by the dashed box in FIG. 2.

To provide a reference mixer output, the transmit signal $S_T$ and the reference signal $S_{REF}$ are provided to the second mixer 38. The transmit signal $S_T$ and the reference signal $S_{REF}$ are combined by the second mixer 38, resulting in a reference mixer output indicative of a difference between the transmit signal $S_T$ and the reference signal $S_{REF}$. The main reason for doing this is that there may be drifts over time, such as due to varying temperatures, in the difference between the transmit signal $S_T$ and the reference signal $S_{REF}$. In embodiments where there is a constant non-zero frequency difference between the transmit signal $S_T$ and the reference signal $S_{REF}$, the portion of the reference mixer output that is of interest for additional processing will exhibit a frequency that is substantially equal to this non-zero frequency difference. To facilitate subsequent signal processing, the reference mixer output may therefore optionally be passed through a second analog bandpass filter 40, as is schematically indicated by the dashed box in FIG. 2.

As is schematically shown in FIG. 2, the mixer output is sampled by the first sampler 42, which may be controlled by the timing circuitry 41 to be synchronized with the operation of the first signal generator 31 and the second signal generator 33. The sampled mixer output may optionally be passed through a first digital bandpass filter 44, as is schematically indicated by the dashed box in FIG. 2. In the same way, the reference mixer output is sampled by the second sampler 43, and the sampled reference mixer output may optionally be passed through a second digital bandpass filter 45.

The sampled values of the mixer output and the reference mixer output are provided to the measurement block 46, where the amplitude and the phase of the mixer output is measured in relation to the amplitude and phase of the reference mixer output according to one of several methods per se well known to those of ordinary skill in the art. The measured values of the amplitude and phase as a function of frequency of the transmit signal $S_T$ are then further processed by the transformation block 47 and the level determining block 49 to determine the filling level L in the tank 9, and provide a signal indicative thereof.

It should be noted that elements of the transceiver 19 may be implemented in hardware, and may form part of an integrated unit normally referred to as a microwave unit, and that at least some portions of the processing circuitry 21 may be embodied by software modules executed by an embedded processor. The invention is not restricted to this particular realization, and any implementation found suitable to realize the herein described functionality may be contemplated.

Figure 3:
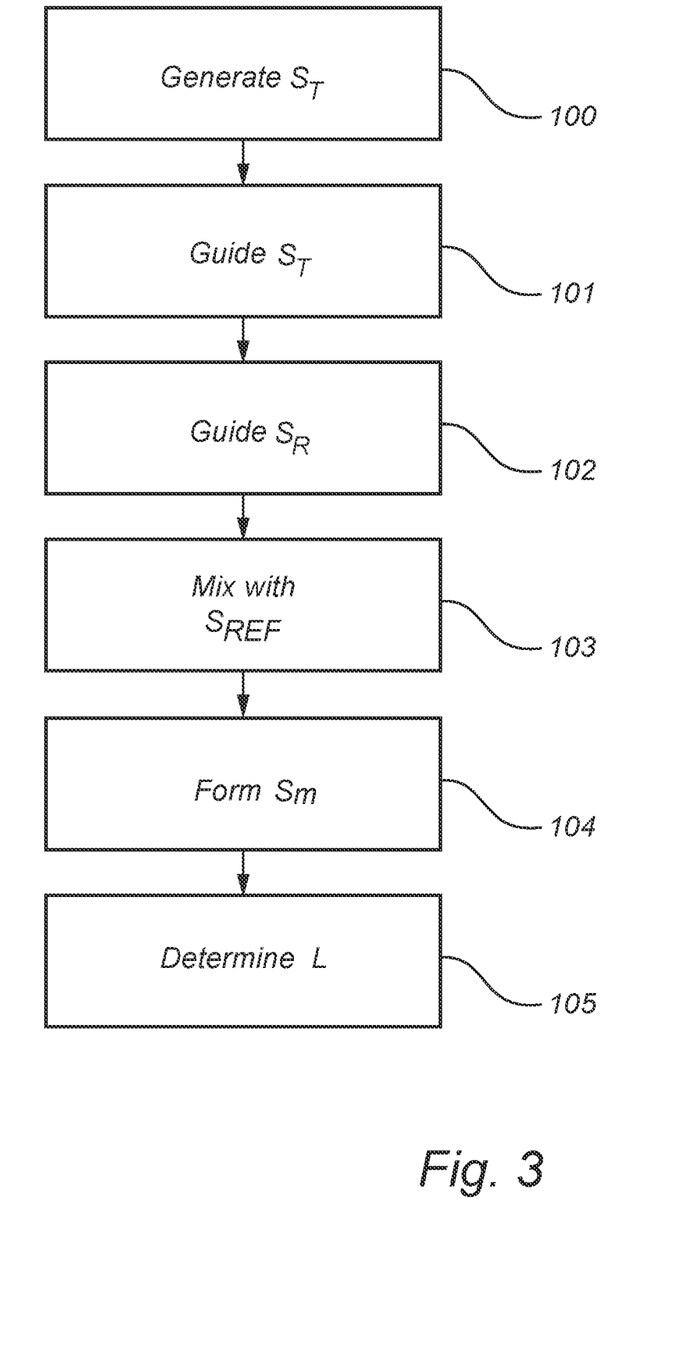
FIG. 3 is a flow-chart schematically illustrating a method according to an embodiment of the present invention.

Exemplary operation of the radar level gauge system 3 described so far will be described in greater detail further below with reference to the flow-chart in FIG. 3 and other illustrations as indicated.

Figure 4:
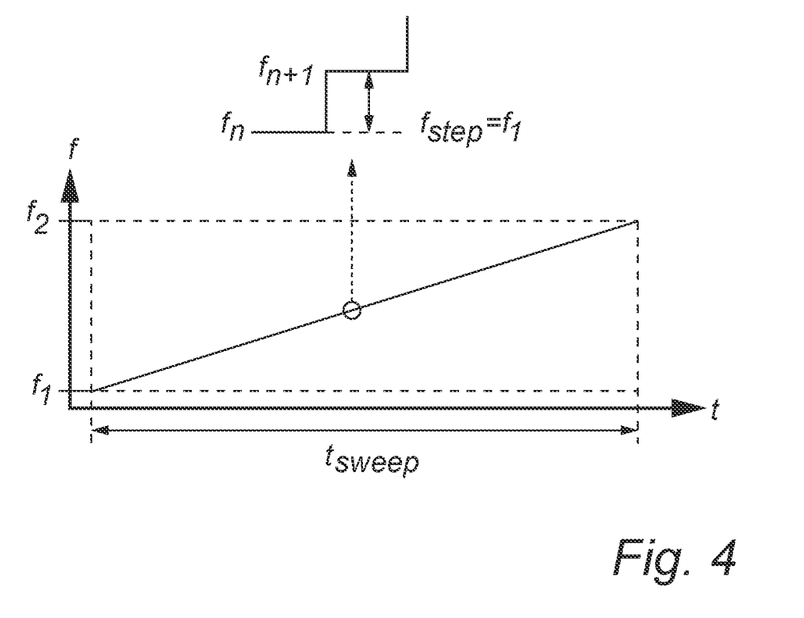
FIG. 4 is a diagram schematically illustrating a measurement sweep that may be used in an example embodiment of the present invention.

In a first step 100, an electromagnetic transmit signal $S_T$ is generated. With further reference to FIG. 4, the transmit signal $S_T$ exhibits a measurement sweep that is transmitted during a sweep time $t_{sweep}$. As can be seen in the enlarged portion of FIG. 4, the measurement sweep is across a time series of piece-wise constant frequencies $f_n$. The frequencies in this time series of piece-wise constant frequencies $f_n$ are within a measurement frequency range starting at a first frequency $f_1$ and ending at a second frequency $f_2$, which is higher than the first frequency $f_1$. A difference $f_{step}$ between frequencies in each pair of adjacent frequencies $f_n$, $f_{n+1}$ in the frequency range is equal in magnitude to the first frequency $f_1$. Accordingly, if the first frequency $f_1$ is, say, 1 MHz, then the difference $f_{step}$ is 1 MHz. Referring back to FIG. 2, the timing circuitry 41 may control the first signal generator 31 to generate the above-described measurement sweep.

Although a single measurement sweep is shown in FIG. 4, it should be understood that the transmit signal $S_T$ may typically include a sequence of measurement sweeps. Furthermore, the frequency need not be monotonically increasing as is shown in FIG. 4. In embodiments, a measurement sweep may start at the second frequency $f_2$ and end at the first frequency $f_1$. According to other embodiments, the frequencies may be output in arbitrary order. In such embodiments, it may be desirable to sort sampled values in order of increasing frequency of the transmit signal, from the first frequency $f_1$ to the second frequency $f_2$ before certain digital processing.

In the subsequent step 101, the transmit signal $S_T$ is guided by the transmission line probe 13 towards and into the product 7 in the tank 9.

An electromagnetic reflection signal $S_R$ resulting from reflection of the transmit signal $S_T$ at impedance discontinuities encountered thereby is guided by the transmission line probe 13 back towards the transceiver 19. Referring to FIG. 2, the reflection signal $S_R$ is passed, via the power divider 35, to the mixer 37.

In the mixer 37, the reflection signal $S_R$ is mixed with an electromagnetic reference signal $S_{REF}$, in step 103. The reference signal $S_{REF}$ exhibits a reference sweep across a time series of piece-wise constant reference frequencies. The reference signal $S_{REF}$ is in phase with the transmit signal $S_T$ at the start of the measurement sweep and exhibits a constant frequency difference in relation to the transmit signal $S_T$ across the measurement sweep. The constant frequency difference may advantageously be non-zero, but could also be zero in certain embodiments. Accordingly, the reference sweep is identical to the measurement sweep in FIG. 4, with the exception of a frequency offset.

Referring back to FIG. 2, the timing circuitry 41 may control the second signal generator 33 to generate the reference sweep. In embodiments with a zero frequency difference, there would be no need for the second signal generator 33, but the transmit signal $S_T$ could be directly provided to the mixer 37 and mixed with the reflection signal $S_R$. It may, however, be beneficial to use first 31 and second 33 signal generators and a non-zero frequency difference, since this allows for the use of relatively cheap square-wave clock generators as signal generators. Unwanted frequencies may be removed using a bandpass filter—either or both of the analog filter 39 and the digital filter 45 indicated in FIG. 4—only allowing frequencies close to the non-zero frequency difference to pass. A suitable frequency difference may be in the order of kHz, such as 5 kHz.

As is, per se, well-known, the output from the mixer 37—the mixer output—is indicative of a difference between the signals input to the mixer 37. In this case, the mixer output is thus indicative of the difference between the reflection signal $S_R$ and the reference signal $S_{REF}$.

In the subsequent step 104, a measurement signal $S_m$ is formed based on the mixer output. As is schematically indicated in FIG. 2, formation of the measurement signal may include sampling the mixer output, by the first sampler 42, and the reference mixer output, by the second sampler 43, at sampling times that are coordinated with the frequency steps of the transmit signal $S_T$. At least one sample of each of the mixer output and the reference mixer output may be taken for each piece-wise constant frequency in the measurement sweep. To achieve this, the first sampler 42 and the second sampler 43 may, for example, be controlled by the timing circuitry 41 as indicated in FIG. 2. The mixer output can be seen as a complex signal with a real component representing the amplitude of the mixer output and an imaginary component representing the phase of the mixer output, and the reference mixer output can be seen as a complex signal with a real component representing the amplitude of the reference mixer output and an imaginary component representing the phase of the reference mixer output. Based on the mixer output and the reference mixer output, the phase of the mixer output can be related to the phase of the transmit signal $S_T$, so that the amplitude and the phase of the mixer output can be measured by the measurement block 46 in FIG. 2. It should be noted that there may other ways of referencing the phase of the mixer output to the phase of the transmit signal $S_T$. For instance, the phase of the transmit signal $S_T$ may be assumed to exhibit predefined values for the different frequency steps and may be stored in memory. The configuration in FIG. 2 is, however, expected to provide more accurate results when the radar level gauge system 3 is subjected to varying temperatures etc.

Finally, in step 105, the filling level L is determined, by the level determining block 49, based on the measurement signal $S_m$.

Figure 5A:
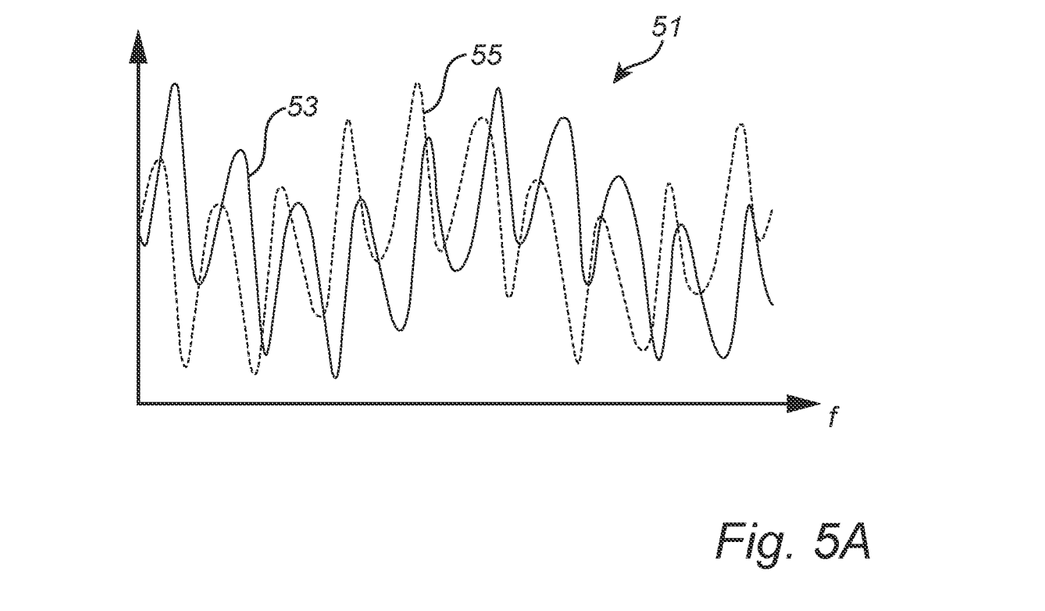
FIG. 5A is a diagram schematically illustrating a first exemplary measurement signal, in the frequency domain.

The step 104 of forming the measurement signal $S_m$ may advantageously include forming a frequency domain measurement signal indicative of the amplitude and the phase of the mixer output as a function of the frequency of the transmit signal $S_T$, as described above. This frequency domain measurement signal may be used directly in step 105 to determine the filling level L. An example of such a frequency domain measurement signal 51 is shown in FIG. 5A, where the solid line 53 represents samples of the above-mentioned real component of the mixer output, and the dashed line 55 represents samples of the above-mentioned imaginary component of the mixer output.

Figure 5B:
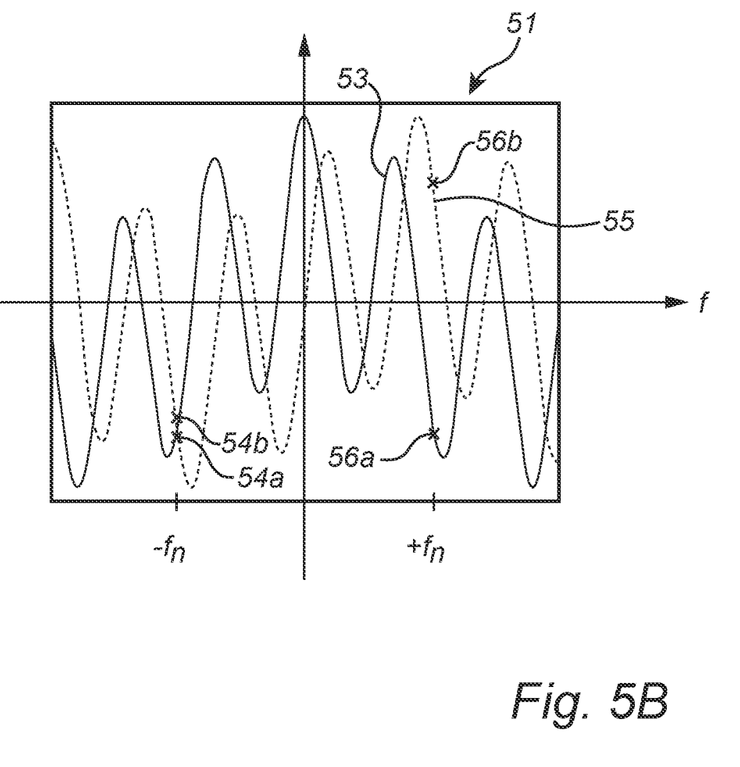
FIG. 5B is a diagram schematically illustrating a second exemplary measurement signal, in the frequency domain.
Figure 6:
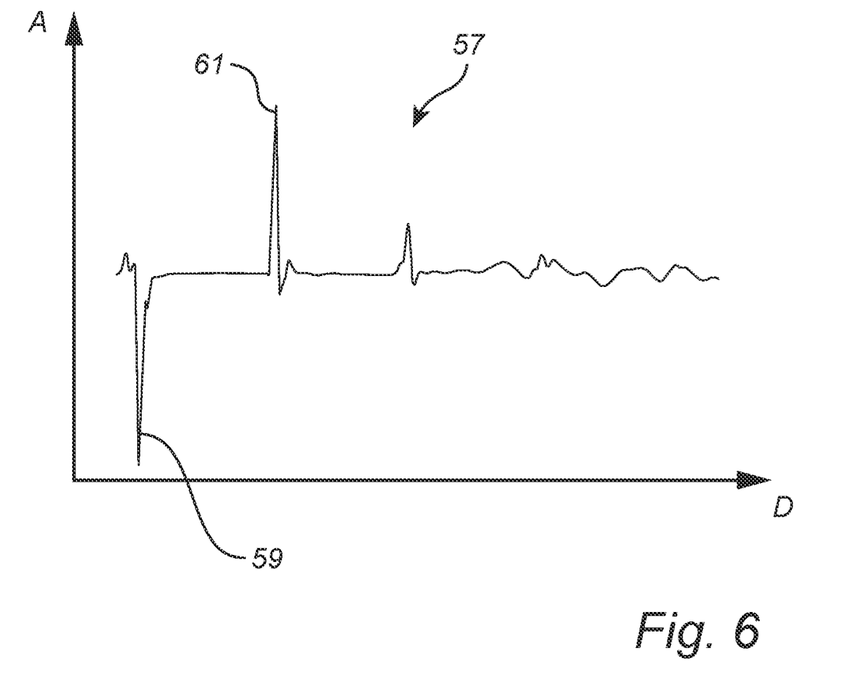
FIG. 6 is a diagram schematically illustrating an exemplary measurement signal, in the time domain, formed based on the frequency domain measurement signal in FIG. 5B.

With reference to FIG. 5B, the frequency domain measurement signal 51 may alternatively be formed by additionally adding mirrored data sets for negative frequencies. Referring to FIG. 5B, each mirrored data set 54a-b for a negative frequency value $-f_n$ is a complex conjugate of a data set 56a-b of the measured amplitude and phase of the mixer output for the corresponding positive frequency value $+f_n$. When the frequency domain measurement signal 51 in FIG. 5B is transformed, by the transformation block 47, to a time domain measurement signal, echo peaks with different polarities depending on the properties of the different encountered impedance discontinuities can be obtained. An example of such a time domain measurement signal 57 is shown in FIG. 6.

Based on the time domain measurement signal 57, it is straight-forward to translate the time to distance D from the transceiver 19 (typically from some reference structure, such as the tank feed-through 29) to the surface 17 of the product 7 (the "ullage"), which can easily be converted to the filling level L. In the exemplary time domain measurement signal 57 (converted to distance D) in FIG. 6, the reflection from the tank feed-through is a negative peak 59, and the reflection from the surface 17 is the first strong positive peak 61.

The transformation to the time domain may advantageously include performing inverse digital fourier transformation on the frequency domain measurement signal 51. The above-mentioned addition of the mirrored data sets is made possible by the specific property of the frequency step $f_{step}$ being equal to the first frequency $f_1$ of the measurement sweep (see FIG. 4). This, in turn allows for determination of the polarities of the reflection peaks, which facilitates identification of the so-called fiducial pulse (the negative peak 59) and the surface reflection (which may for example be the first positive peak 61 that is higher than a predefined threshold). For example, inverse fast fourier transformation (IFFT) may be used.

Through a suitable choice of the first frequency $f_1$, the phase of the measurement signal $S_m$ will be unambiguous across the desired measurement range. The desired measurement range will depend on the application. For a longer measurement range, the first frequency may be selected to be relatively low. For instance, a first frequency $f_1$ of 1 MHz will correspond to a maximum range of about 300 m, which should be more than enough for most applications. For most tank gauging application, the first frequency $f_1$ may advantageously be in the range 0.5 MHz to 4 MHz.

Regarding the choice of value for the second frequency $f_2$, this will typically be a trade-off between measurement time/energy consumption and accuracy. For most tank gauging application, the second frequency $f_2$ of the measurement sweep may be in the range 500 MHz to 4 GHz.

In certain applications, it may be desired to measure very short distances very precisely. Then the first frequency $f_1$ may be selected higher, such as 10 MHz, and the second frequency $f_2$ may also be selected higher, such as 10 GHz.

The person skilled in the art realizes that the present invention by no means is limited to the preferred embodiments described above. On the contrary, many modifications and variations are possible within the scope of the appended claims.

What is claimed is:

1. A method of determining a filling level of a product in a tank using a radar level gauge system comprising a transceiver, a transmission line probe, and processing circuitry, the method comprising the steps of:
generating an electromagnetic transmit signal exhibiting a measurement sweep across a time series of piece-wise constant frequencies being within a measurement frequency range starting at a first frequency, and ending at a second frequency higher than the first frequency, a difference between frequencies in each pair of adjacent frequencies in the frequency range being equal to the first frequency;
guiding the transmit signal towards and into the product in the tank;
guiding an electromagnetic reflection signal resulting from reflection of the transmit signal at impedance discontinuities encountered thereby, back towards the transceiver;
mixing the reflection signal with an electromagnetic reference signal exhibiting a reference sweep across a time series of piece-wise constant reference frequencies, the reference signal being in phase with the transmit signal at a start of the measurement sweep and exhibiting a constant frequency difference in relation to the transmit signal across the measurement sweep, the mixing resulting in a mixer output indicative of a difference between the reflection signal and the reference signal;
forming a measurement signal based on the mixer output; and
determining the filling level based on the measurement signal.

2. The method according to claim 1, wherein the step of forming the measurement signal comprises the steps of:
measuring an amplitude and a phase of the mixer output for each frequency of the transmit signal;
forming a frequency domain measurement signal indicative of the amplitude and the phase of the mixer output as a function of the frequency of the transmit signal; and
transforming the frequency domain measurement signal to a time domain measurement signal.

3. The method according to claim 2, wherein the step of the forming the frequency domain measurement signal further comprises the step of:
adding mirrored data sets for negative frequencies, each mirrored data set for a negative frequency value being a complex conjugate of a data set of the measured amplitude and phase of the mixer output for the corresponding positive frequency value.

4. The method according to claim 2, wherein the step of transforming includes performing inverse digital fourier transformation on the frequency domain measurement signal.

5. The method according to claim 1, further comprising the step of:
filtering at least one of the mixer output and the measurement signal using a bandpass filter having a passband including a frequency being identical to the frequency difference between the reference signal and the transmit signal.

6. The method according to claim 1, wherein the frequency difference between the reference signal and the transmit signal is non-zero.

7. The method according to claim 1, wherein the first frequency of the measurement sweep is in the range 0.5 MHz to 4 MHZ.

8. The method according to claim 1, wherein the second frequency of the measurement sweep is in the range 500 MHz to 4 GHz.

9. A radar level gauge system, for determining a filling level of a product in a tank, the radar level gauge system comprising:
a transceiver for generating, transmitting, and receiving electromagnetic signals;
a transmission line probe coupled to the transceiver and configured to guide an electromagnetic transmit signal from the transceiver towards and into the product in the tank, and guide an electromagnetic reflection signal resulting from reflection of the transmit signal at impedance discontinuities encountered thereby, back towards the transceiver; and
processing circuitry coupled to the transceiver for determining the filling level based on a timing relation between the reflection signal and the transmit signal,
wherein the radar level gauge system is configured to:
generate the transmit signal to include a measurement sweep across a time series of piece-wise constant frequencies being within a measurement frequency range starting at a first frequency, and ending at a second frequency higher than the first frequency, a difference between frequencies in each pair of adjacent frequencies in the frequency range being equal to the first frequency;
mix the reflection signal with an electromagnetic reference signal exhibiting a reference sweep across a time series of piece-wise constant reference frequencies, the reference signal being in phase with the transmit signal at a start of the measurement sweep and exhibiting a constant frequency difference in relation to the transmit signal across the measurement sweep, the mixing resulting in a mixer output indicative of a difference between the reflection signal and the reference signal;
form a measurement signal based on the mixer output; and
determine the filling level based on the measurement signal.

10. The radar level gauge system according to claim 9, wherein the radar level gauge system is configured to:
form a frequency domain measurement signal indicative of an amplitude and a phase of the mixer output as a function of the frequency of the transmit signal; and
transform the frequency domain measurement signal to a time domain measurement signal.

11. The radar level gauge system according to claim 10, wherein the radar level gauge system is configured to form the frequency domain measurement signal by determining data sets of the amplitude and phase of the mixer output for different frequencies of the transmit signal and adding mirrored data sets for negative frequencies, each mirrored data set for a negative frequency value being a complex conjugate of a data set of the measured amplitude and phase of the mixer output for the corresponding positive frequency value.

12. The radar level gauge system according to claim 10, wherein the radar level gauge system is configured to transform the frequency domain measurement signal to the time domain measurement signal by performing inverse digital fourier transformation on the frequency domain measurement signal.

13. The radar level gauge system according claim 9, wherein the transceiver further comprises a bandpass filter arranged and configured to filter one of the mixer output and the measurement signal.

14. The radar level gauge system according to claim 9, wherein the transmission line probe is a single conductor probe configured to guide the transmit signal and the reflection signal as surface waves.

15. The radar level gauge system according to claim 9, wherein the transmission line probe is one of a coaxial probe and a parallel wire transmission line probe.

* * * * *